P. C. SCHAANNING.
PLANT FOR REMOVING WATER FROM PULP IN WOOD PULP MILLS.
APPLICATION FILED DEC. 9, 1913.
1,094,378.
Patented Apr. 21, 1914.
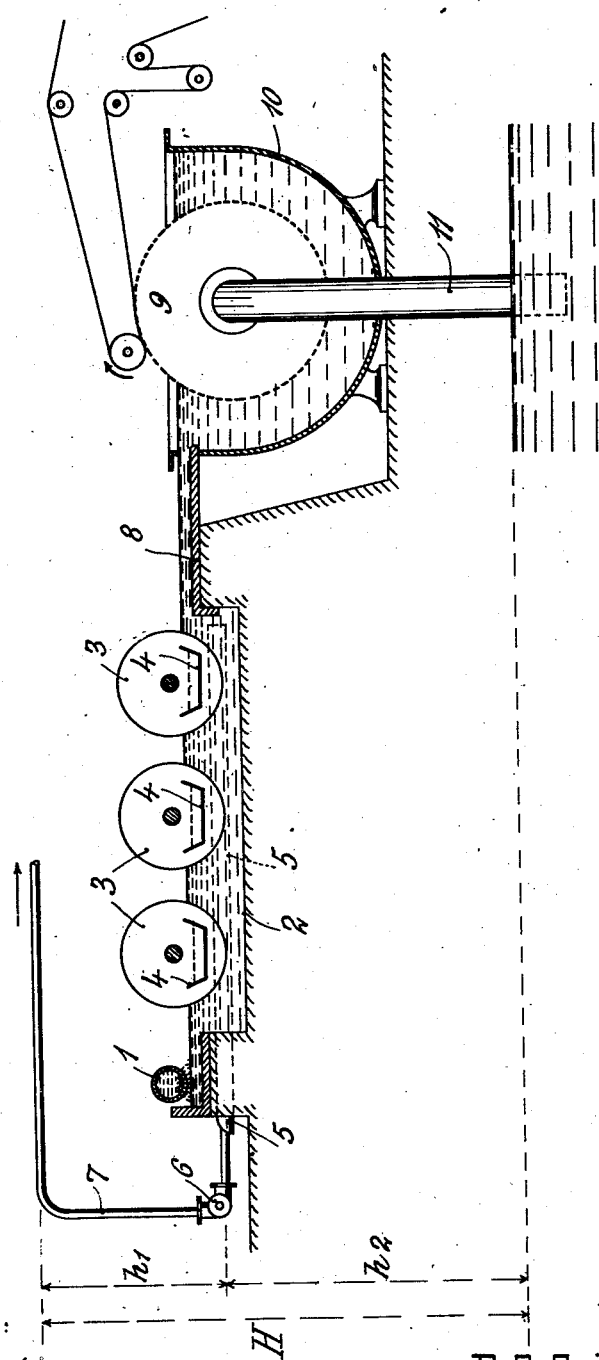
Witnesses:
Inventor:
P. C. Schaanning
by
Attorney

UNITED STATES PATENT OFFICE.

PEDER CHRISTIAN SCHAANNING, OF CHRISTIANIA, NORWAY.

PLANT FOR REMOVING WATER FROM PULP IN WOOD-PULP MILLS.

1,094,378.

Specification of Letters Patent. Patented Apr. 21, 1914.

Application filed December 9, 1913. Serial No. 805,564.

*To all whom it may concern:*

Be it known that I, PEDER CHRISTIAN SCHAANNING, a subject of the Kingdom of Norway, and residing at Baekkelaget, pr. Christiania, Norway, have invented certain new and useful Improvements in Plants for Removing Water from Pulp in Wood-Pulp Mills, of which the following is a full, clear, and exact description, reference being made to the accompanying drawing, which shows one form of plant embodying the improvements.

The objects of this invention are, to speedily remove water from the pulp, and to reduce the cost of erection and of maintaining a plant of the desired character.

The pulp discharged from the grinding apparatus is diluted with water, generally in the proportions of from 1 part of pulp to 500–700 parts of water. This has been a suitable condition or degree of dilution when the pulp is to be received on ordinary strainers operating without suction. Pulp of a materially higher degree of concentration will not be satisfactorily deposited on the wires of such strainers; it will coil up, and fall from the wires. It has been found, however, that suction-strainers (those operated by or utilizing suction) are considerably more advantageous, in having a pulp-receiving capacity so much greater as to enable the pulp to be fed onto them at a degree of concentration up to 1 part of pulp to 100 parts of water without coiling itself or falling from the strainer. In taking advantage of this fact, I subject the pulp to the action of water-removing means, before the pulp reaches a suction-strainer. In the present case, the water-removing apparatus may comprise a series or succession of strainers which remove a substantial portion of the water, reducing the proportions from 1–600 to, for instance, 1–100, in which latter conditions the pulp will then be subjected to the action of a suction-strainer, for a final water-removing operation. The resulting benefits are, considerable increase in productiveness of the suction-strainers, and reduction in cost of construction and of operation and for attendance.

Referring to the accompanying drawing, 1 indicates a pipe or chute, leading from the sorting apparatus and delivering pulp, in highly-diluted condition, to a basin or reservoir, 2. A number (shown as a series or succession) of water-removing strainers, 3, are shown as dipping into the diluted pulp in the basin. Cylindrical revoluble strainers are shown, and during the motion of the pulp past these strainers, each of the latter lifts large quantities of water, containing farinaceous pulp matter, and the water thus removed is caught in the chutes or troughs, 4, to be led off through a pipe, 5, to a pump, 6, destined to raise the water through a pipe, 7, preferably for re-use in dilution of pulp. The removal of water from the pulp by the succession of strainers, 3, gradually concentrates the pulp, so that, at the discharge end, 8, of the basin, the pulp may have reached a dilution of, for instance, 1 part pulp to 100 parts of water. In this concentrated condition, the pulp is fed or led into a receptacle, 10, for a suction-strainer, 9. The pulp, freed from much farinaceous matter and water, quickly forms as a coat on the wire of the suction-strainer, to hold back farinaceous matter from a discharge pipe 11. As a result, substantially pure water is discharged from the apparatus into a river or other point.

It is to be noted that the illustrated form of apparatus requires pumping of separated water only the distance represented by $h^1$, not the entire height represented by H—thus saving the power otherwise called for to raise the water the distance (from 3 to 5 meters) represented by $h^2$.

As an example of the comparative economy resulting from a plant made according to my invention, it is pointed out that a grinding mill employing ten ordinary strainers (known as "Gaara strainers"), with a productiveness of six tons, for removing water, requires five attendants per working period—or ten workmen in each twenty-four hours—while a plant of like capacity with the substitution of suction-strainers reduces the number of these to two (with six water-removing strainers in addition); and the number of workmen to two for each working-period, or four for each twenty-four hours. In the first case, it is difficult for an attendant to manage more than two machines, requiring him to constantly walk to and fro to attend to them alternately, while in the second case, water-removing strainers require no attendance and one workman cares for two suction-strainers. Additional economies are attained with respect to space and first cost, two pulp-making machines being required as against ten of the older kind, six water-removing strainers, in a common wooden box, and two suction-strainers, occupying less space and being considerably cheaper to construct and maintain than ten ordinary strainers in separate boxes. It is also obvious that the consumption of fittings (for instance, the consumption of felt) will be highly reduced. Another advantage resulting from this invention, in rebuilding old grinding mills, is that old strainers can be employed as water-removing strainers, reducing the rebuilding expenses much lower than if a large number of exclusively suction-strainers were required.

I claim:

1. In a plant for removing water from pulp in wood pulp mills, a substantially horizontal reservoir, means to feed highly diluted pulp thereto, a series of water removing strainers arranged in spaced relation in said reservoir, a receptacle at the outlet end of the reservoir spaced therefrom and communicating therewith, a suction strainer in said receptacle, a drain pipe communicating with the series of strainers, and a water lifting pump in connection with the drain pipe.

2. In a plant for removing water from pulp in wood pulp mills, a substantially horizontal reservoir, means to feed highly diluted pulp thereto, a series of water removing strainers arranged in spaced relation in said reservoir, a receptacle at the outlet end of the reservoir communicating therewith, a suction strainer in said receptacle, and means for draining water from said series of strainers.

In testimony whereof I have signed my name to this specification in the presence of two subscribing witnesses.

PEDER CHRISTIAN SCHAANNING.

Witnesses:
M. E. GUTTERMSEN,
RUTH LINDSTROM.